United States Patent
Fukui

(10) Patent No.: US 7,673,610 B2
(45) Date of Patent: Mar. 9, 2010

(54) INTAKE DEVICE FOR VEHICLE ENGINE

(75) Inventor: Masato Fukui, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 454 days.

(21) Appl. No.: 11/395,541

(22) Filed: Apr. 3, 2006

(65) Prior Publication Data

US 2006/0243250 A1 Nov. 2, 2006

(30) Foreign Application Priority Data

Apr. 4, 2005 (JP) .................... P. 2005-107715

(51) Int. Cl.
*F02B 31/00* (2006.01)
(52) U.S. Cl. ............... 123/308; 123/184.21
(58) Field of Classification Search ...............
123/184.21–184.61, 432, 188.14, 315, 308
See application file for complete search history.

(56) References Cited

U.S. PATENT DOCUMENTS

| | | | | |
|---|---|---|---|---|
| 2,163,040 A * | 6/1939 | Jacoby | .................. | 123/184.38 |
| 2,390,913 A * | 12/1945 | Barrett | .................. | 60/605.1 |
| 2,427,115 A * | 9/1947 | Barrett | .................. | 123/184.38 |
| 3,796,048 A * | 3/1974 | Annus et al. | ........... | 60/605.1 |
| 5,630,387 A * | 5/1997 | Kamiyama | ......... | 123/184.38 |
| 6,609,499 B2 * | 8/2003 | Kabat et al. | ......... | 123/432 |
| 7,150,255 B2 * | 12/2006 | Uruno et al. | ......... | 123/184.21 |
| 2004/0182348 A1 * | 9/2004 | Sato et al. | ........... | 123/184.21 |

FOREIGN PATENT DOCUMENTS

JP 2002-317639 10/2002

* cited by examiner

*Primary Examiner*—M. McMahon
(74) *Attorney, Agent, or Firm*—Smith, Gambrell & Russell, LLP

(57) ABSTRACT

A cylinder head of an engine body is provided with intake ports and exhaust ports, which are connected with and opened to a combustion chamber. The intake ports are disposed in one of right and left sides of the cylinder head with respect to a vehicle driving direction, and the exhaust ports are disposed in the other of the right and left sides of the cylinder head. An intake pipe 61 passes around the cylinder head 31 at a side of the engine body, therefore, a curved portion 63 is formed in the intake pipe. A larger amount of fresh air enters the combustion chamber from one intake port than the other intake port, thus swirl occurs in the combustion chamber. An injector that injects fuel into the intake pipe is positioned at a side of the intake pipe.

25 Claims, 4 Drawing Sheets

INTAKE DEVICE FOR VEHICLE ENGINE

The present application claims foreign priority based on Japanese Patent Application No. P.2005-107715, filed on Apr. 4, 2005, the contents of which are incorporated herein by reference.

BACKGROUND OF THE INVENTION

1. Field of the Invention

The present invention relates to a vehicle engine and particularly to an intake device in the vehicle engine having an injector injecting fuel (e.g. gasoline) into an intake pipe.

2. Related Art

A four-stroke-cycle gasoline engine includes a crank case in which a crankshaft is rotatably supported and a cylinder provided in the crank case. A piston, which is accommodated and reciprocates in the cylinder, is connected to the crankshaft through a connecting rod. A combustion chamber defined over the top of the piston by the cylinder and a cylinder head provided over the cylinder. An intake pipe supplying the combustion chamber with air-fuel mixture and an exhaust pipe discharging combustion gases are connected to the cylinder head. An intake port opened to the combustion chamber is connected to the intake pipe and an exhaust port also opened to the combustion chamber is connected to the exhaust pipe. The cylinder head includes an intake valve and exhaust valve, which open or close the intake port and exhaust port, respectively.

When the air-fuel mixture enters the combustion chamber through the intake port, the air-fuel mixture may swirl, thereby combustion is completed in a relatively short period of time. According to JP-A-2002-317639, the air-fuel mixture swirls in the combustion chamber by changing the open-close lift amount and valve-opening timings between two intake valves which open or close corresponding intake ports in a cylinder head, respectively.

In order to generate swirl in a combustion chamber as described above procedure, it is required to change open-close lift amount and valve-opening timings between two valves, respectively, therefore, complex valve-operating mechanism is required, which results in high manufacturing cost.

There are transverse-mounted type and longitudinal-mounted type engines in typical engines for vehicles including an all terrain vehicle. In the transverse-mounted engine in which a crankshaft is transversely mounted in a vehicle along the vehicle width, an intake port is located in a front side of the engine in a vehicle driving direction (vehicle longitudinal direction), and an exhaust port is located in a rear side of the engine in the vehicle driving direction. In this configuration, since the intake port is positioned at the front of the vehicle, wind based on a vehicle speed enters the engine from an air intake disposed at a front side of the engine. Therefore, fresh air is efficiently supplied into the engine. On the other hand, in the longitudinal-mounted type engine, the engine is mounted in the vehicle such that the crankshaft is parallel to the vehicle driving direction, thus the intake and exhaust ports are located left or right side of a cylinder head, respectively.

In the cylinder head, a valve-operating mechanism including a cam shaft operating a valve-operating cam and a rocker shaft supporting a rocker arm is accommodated in a space defined by the cylinder head and a rocker cover combined with it. The cam shaft has a driven sprocket driven through a chain meshed with a driving sprocket fitted to the crankshaft. In an engine to be mounted in the vehicle in longitudinal direction (vehicle traveling direction) thereof, the driven sprocket projects out over the intake port or the exhaust port in an upper side of the cylinder head. Therefore, in order to supply the fresh air to the intake port from the air intake disposed on the front side of the engine, the intake pipe is required to climb over a portion of the rocker cover where the driven sprocket is accommodated and to go around an upper portion of the engine. Accordingly, a height of the engine including the intake pipe increases. Moreover, when an injector for injecting gasoline into the intake pipe is mounted on the intake pipe, the height of the engine including the injector further increases.

SUMMARY OF THE INVENTION

It is an object to generate swirl in a combustion chamber depending on a shape of an intake pipe.

It is another object to reduce an automotive engine in height.

In accordance with one or more embodiments of the present invention, a vehicle engine is provided with: a crank case that rotatably supports a crankshaft extending in a vehicle driving direction; a cylinder in which a piston is reciprocatively mounted; a cylinder head mounted on the cylinder; an intake port opened to a combustion chamber between the piston and the cylinder head and positioned on one of right and left sides of the cylinder head with respect to the vehicle driving direction; an exhaust port opened to the combustion chamber and positioned on the other of the right and left sides; an intake pipe connected to the intake port; and an exhaust pipe connected to the exhaust port; wherein the intake pipe includes a curved portion bent from a front portion of the cylinder head to the side of the cylinder head.

Further, in accordance with one or more embodiments of the present invention, the vehicle engine further comprises an injector for injecting fuel into the intake pipe and mounted at the side of the intake pipe.

Further, in accordance with one or more embodiments of the present invention, the intake pipe may be bent at substantially 90 degree at the curved portion.

Further, in accordance with one or more embodiments of the present invention, the curved portion may be positioned under the top face of the cylinder head.

Further, in accordance with one or more embodiments of the present invention, the cylinder head may be provided with two intake ports including a first intake port into which fresh air at the outer area of the curved portion flows, and a second intake port into which fresh air at the inner area in the curved portion flows. In addition, the fresh air flowing into the combustion chamber from the first intake port may swirl in the combustion chamber.

Further, in accordance with one or more embodiments of the present invention, the injector may be disposed on the outer wall of the curved portion.

In accordance with one or more embodiments of the present invention, the intake pipe does not pass through over the cylinder head to be connected with the intake port, but the intake pipe goes around the upper portion of the cylinder head from the front side of the cylinder head to the side portion of the engine. Therefore, the engine body reduces in height, which is also achieved by positioning the injector at the side of the engine body. As a result, mountability of the engine to the vehicle is improved.

In addition, since the curved portion is formed in the intake pipe and an amount of fresh air flowing at the outer area in the curved portion is larger than an amount of fresh air at the inner area by centrifugal force, therefore, the fresh air enter the combustion chamber from the intake port swirls therein.

Therefore, it is possible to generate swirl through a simple structure without changing the lift amount and varying valve-opening timing of two intake valves.

Other aspects and advantages of the invention will be apparent from the following description and the appended claims.

DETAILED DESCRIPTION OF THE EXEMPLARY EMBODIMENTS

Exemplary embodiments of the invention will be described with reference to the accompanying drawings.

Figure 1:
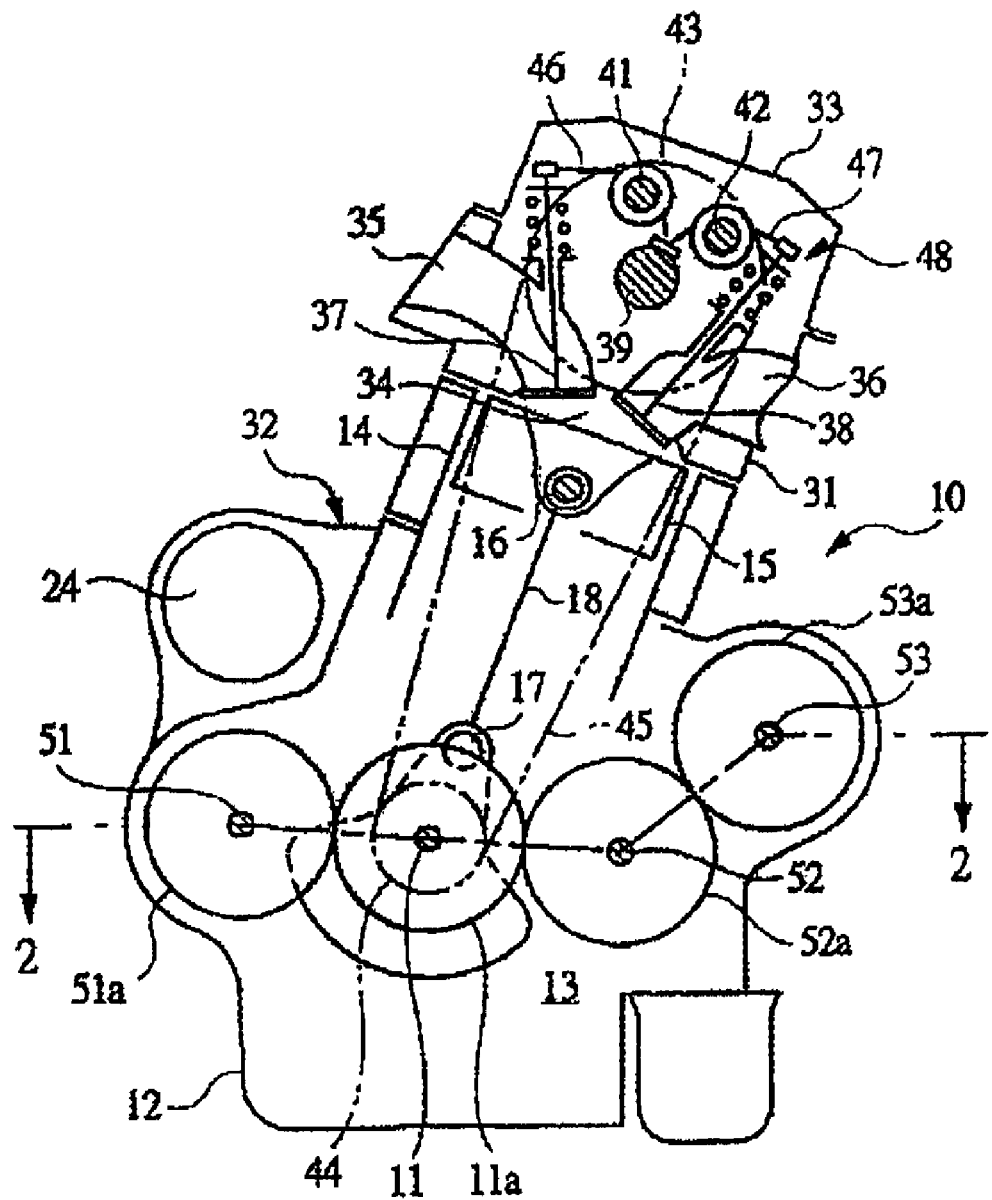
FIG. 1 is a schematic view showing an exemplary embodiment of a vehicle engine.
Figure 2:
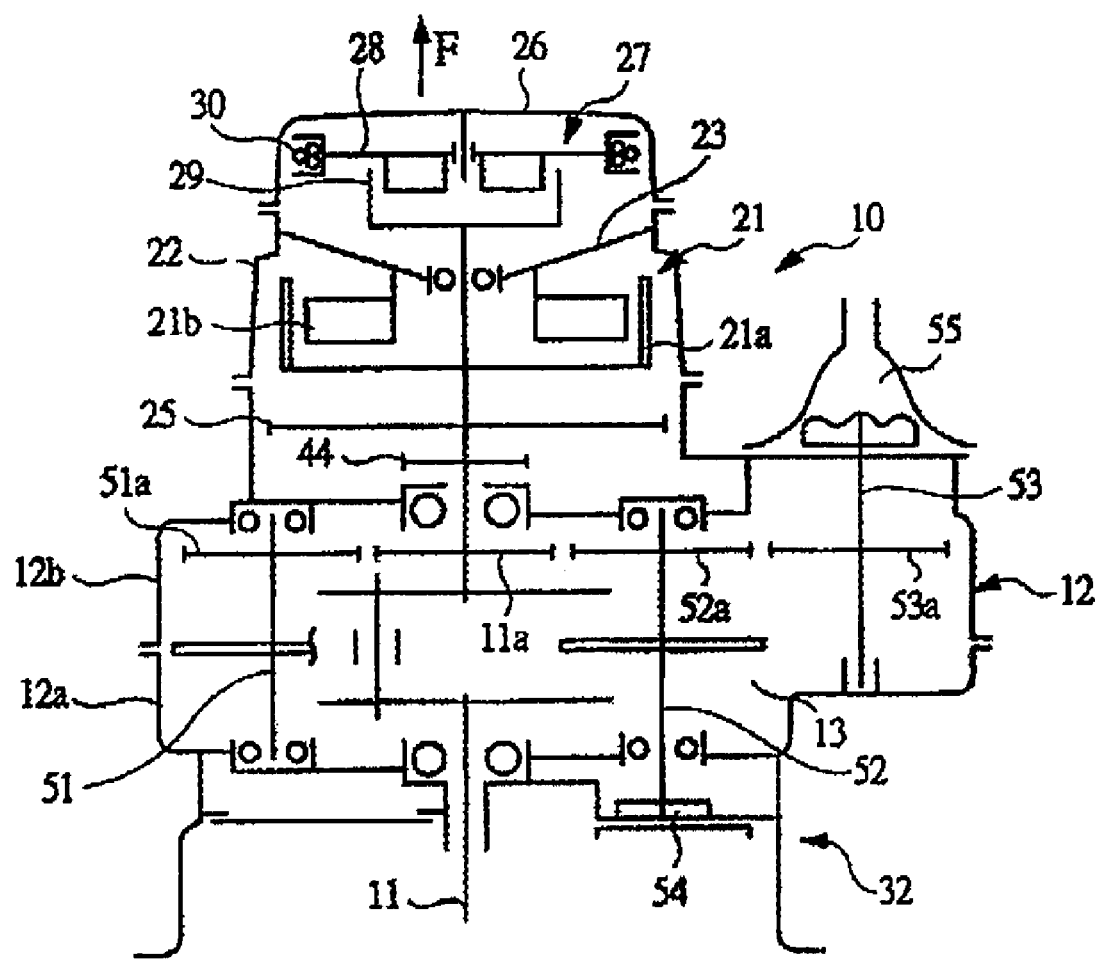
FIG. 2 is a schematic view showing the vehicle engine seen from a line 2-2 in FIG. 1.

FIG. 1 is a schematic view of an engine for a vehicle. FIG. 2 is a schematic view of the engine seen from line 2-2 of FIG. 1.

An engine 10 is adapted to be mounted in an all terrain vehicle (ATV). In the engine 10, a crankshaft 11 is mounted and capable of rotating in a crank case 12. The crank case 12 includes a first case 12a and a second case 12b butt-jointed to the first case 12a, and defines a crank chamber 13 therein. As shown in FIG. 1, a piston 15 is installed and capable of reciprocating in a cylinder 14 provided in the crank case 12. The piston 15 is connected to the crankshaft 11 via a connecting rod 18. One end of the connecting rod 18 is attached to a piston pin 16 and the other end of the connecting rod 18 is attached to a crank pin 17. Accordingly, the crankshaft 11 rotates by the connecting rod 18 as the piston 15 reciprocates.

As shown in FIG. 2, an electric generating unit case 22 accommodating an electric generating unit 21 is fixed to the second case 12b of the crank case 12. The electric generating unit 21 includes an outer rotor 21a fitted to the crankshaft 11 and a stator 21b fixed to a partition 23 provided in the electric generating unit case 22. When the engine 10 runs and the crankshaft 11 rotates, a battery (not shown) is charged by the electric generating unit 21. As shown in FIG. 1, a starter motor 24, which is driven by power from the battery, is mounted in the crank case 12. A pinion (not shown), which travels in an axial direction between a meshing position and a non-meshing position with a starter gear 25 (shown in FIG. 2) fitted to the crankshaft 11 by an electromagnet, is mounted in the crank case 12. Thus, the starter motor 24 starts the engine 10.

A recoil starter 27 is provided in a recoil cover 26 fixed to the electric generating unit case 22 to manually start the engine 10 at the time when the starter motor 24 cannot start the engine 10 due to insufficient charging of the battery. The recoil starter 27 includes a recoil pulley 28, which is mounted and capable of rotating in the recoil cover 26, and a starting wheel 29 fitted to the crankshaft 11. When the recoil pulley 28 is rotated by drawing a recoil rope 30 wound therearound, an engaging member assembled with the recoil pulley 28 is engaged with the starting wheel 29 to rotate the crankshaft 11. As a result, the engine 10 can be also manually started.

In the crankshaft 11, an end protruding from the first case 12a serves as an output end, and the output end is connected to an output shaft through a centrifugal clutch (not shown).

The centrifugal clutch is connected to a driving wheel through a power transmission device including a transmission (not shown). The engine 10 is mounted in the vehicle such that the crankshaft 11 extends in a vehicle traveling direction (a longitudinal direction of the vehicle). As a reference, an arrow 'F' in FIG. 2 indicates a vehicle forwarding direction. When the engine 10 is mounted in the vehicle, the recoil starter 17 faces the front of the vehicle and the output end of the crankshaft 11 faces the rear.

An engine body 32 of the engine 10 is mainly composed of the crank case 12, cylinder 14 and a cylinder head 31 provided over the cylinder 14. A rocker cover 33 is provided on the cylinder head 31. As shown in FIG. 1, an intake port 35 and an exhaust port 36, which are communicated to a combustion chamber 34, are formed in the cylinder head 31. Furthermore, the cylinder head 31 is also provided with an ignition plug (not shown) for combustion of air-fuel mixture flowing from the intake port 35 into the combustion chamber 34. Further, the cylinder head 31 has an intake valve 37 and exhaust valve 38, which open or close the intake port 35 and exhaust port 36, respectively.

As shown in FIG. 1, a cam shaft 39 and two rocker shafts 41 and 42 parallel to the cam shaft are provided in the cylinder head 31 in order to open or close the intake and exhaust valves 37 and 38 in synchronization with the rotation of the crankshaft 11. A sprocket 43 fitted to the cam shaft 39 and a sprocket 44 fitted to the crankshaft 11 are connected by a chain 45. The rocker shaft 41 is provided with a rocker arm 46 for the intake valve, which is driven by a valve-operating cam mounted on the cam shaft 39 to open or close the intake valve 37. In addition, the rocker shaft 42 is provided with a rocker arm 47 for the exhaust valve, which is driven by another valve-operating cam to open or close the exhaust valve 38. Thus, a valve-operating mechanism 48 comprises the cam shaft 39, the rocker shafts 41 and 42, and the rocker arms 46 and 47.

In the engine 10 in which the cylinder head 31 is provided with two intake ports 35, the rocker shaft 41 is provided with two rocker arms 46, which operate two intake valves corresponding to the intake ports 35, respectively. Similarly, in the engine 10 in which the cylinder head 31 is provided with two exhaust ports 36, the rocker shaft 42 is provided with two rocker arms 47. In contrast, the vehicle engine 10 may have one intake port 35 and one exhaust port 36, and also may have two intake ports 35 and one exhaust port 35.

As shown in FIG. 2, a balancer shaft 51, an oil pump driving shaft 52, and a water pump driving shaft 53, which are parallel to the crankshaft 11, are disposed in the crank chamber 13. The shafts 51, 52 and 53 are provided with gears 51a, 52a and 53a, respectively, which are driven by a driving gear 11a fitted to the crankshaft 11. The oil pump driving shaft 52 is connected with a rotor of an oil pump 54, and the water pump driving shaft 53 is connected with a rotor of a water pump 55. The oil pump 54 supplies engine oil in the crank chamber 13 to lubrication-required portions, and the water pump 55 supplies engine coolant into a water jacket formed in the cylinder 14.

Figure 3:
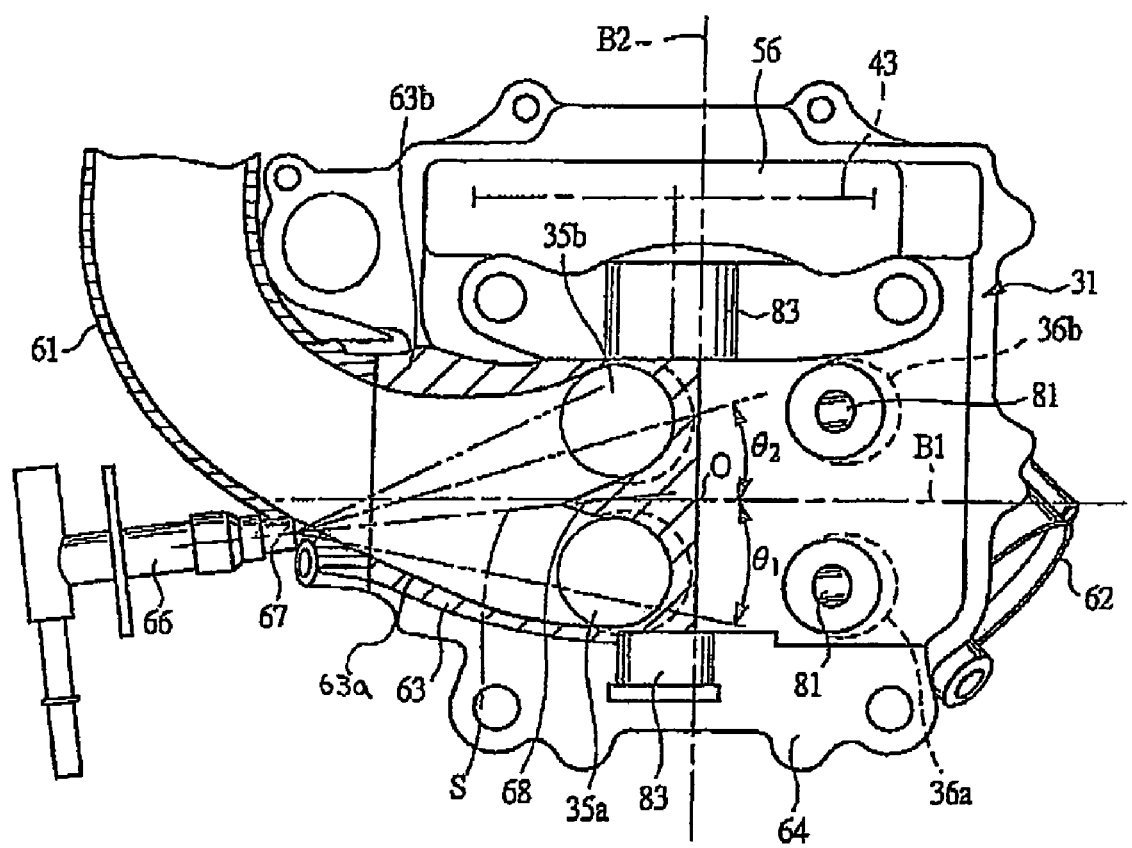
FIG. 3 is a plan view including a partial cross section of an exemplary embodiment of a cylinder head consisting of an intake device in the vehicle engine.
Figure 4:
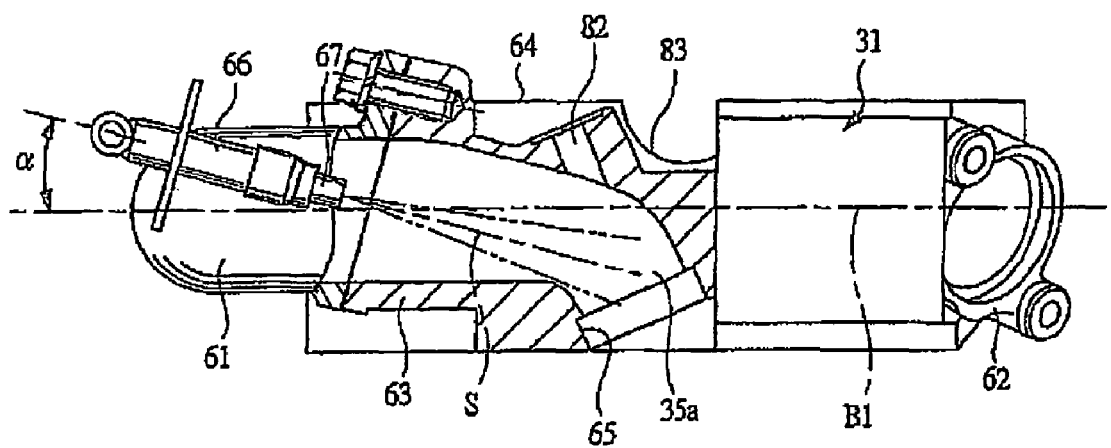
FIG. 4 is a front view of FIG. 3, including a partial cross section.

FIG. 3 is a plan view including a partial cross-section of an exemplary embodiment of an engine intake system in the cylinder head 31 according to the invention, and FIG. 4 is a front view including a partial cross-section of FIG. 3.

When the engine 10 is mounted in the vehicle, the cylinder head 31 is mounted over the cylinder 14 such that a chain chamber 56 accommodating the sprocket 43 and the chain 45 is provided on the front side of the engine 10 and the intake and exhaust ports 35 and 36 are provided on the rear side of the chain chamber 56. A first intake port 35a, a second intake port 35b, a first exhaust port 36a, and a second exhaust port 36b are formed in the cylinder head 31. That is, two intake ports and two exhaust ports are formed in the cylinder head 31. The first intake port 35a and the second intake port 35b are adjacent in the vehicle longitudinal direction. The first exhaust port 36a and the second exhaust port 36b are adjacent in the vehicle longitudinal direction. The intake ports 35a and 35b and the exhaust ports 36a and 36b are formed to be adjacent to each other on left and right sides with respect to the longitudinal direction of the vehicle. (That is, the intake ports 35a and 35b are located on one of the left and right sides, and the exhaust ports 36a and 36b are located on the other of the left and right sides.) Since two intake ports 35a and 35b and two exhaust ports 36a and 36b are formed in the cylinder head 31, two intake valves 37 and two exhaust valves 38 are also provided therein.

To the cylinder head 31, an intake pipe 61 and an exhaust pipe 62 are attached. The intake pipe 61 supplies fresh air from an outside into the combustion chamber 34 through the intake ports 35a and 35b. The exhaust pipe 62 is used to discharge combustion gases from the combustion chamber 34 to the outside through the exhaust ports 36a and 36b. An intake system including an air cleaner, throttle valve, and the like is connected to the intake pipe 61, and an exhaust system including a muffler and the like is connected to the exhaust pipe 62. The intake pipe 61 is formed such that an air-inlet thereof opens in the vehicle longitudinal direction, and has a curved portion 63 bent at about 90 degree to be connected with the intake ports 35a and 35b, so as not to pass the front of the cylinder head 31, that is, just near the chain chamber 56. As shown in FIG. 4, the curved portion 63 is positioned under the top face of the cylinder head 31, i.e. an attachment face 64 where the rocker cover 33 is mounted.

Since the fresh air supplied to the combustion chamber through the intake pipe 61 from the outside turns at about 90 degree at the curved portion 63 and is supplied to the intake ports 35a and 35b, the fresh air is affected by centrifugal force at the curved portion 63. As a result, the fresh air passing the curved portion 63 has different flows at an outer area near an outer wall 63a of the curved portion 63 from at an inner area near an inner wall 63b of the curved portion 63, that is, more air flows through the outer area than the inner area. The fresh air passing through the outer area flows into the combustion chamber 34 through the first intake port 35a, and the fresh air passing through the inner area flows into the combustion chamber 34 through the second intake port 35b. Therefore, according to the difference of the airflows between the first intake port 35a and the second intake port 35b, swirl takes place in the combustion chamber 3. Accordingly, the combustion time can be shortened and also the stable combustion can be carried out even in the lean combustion state.

As shown in FIG. 3, a reference letter 'O' represents a position of cylinder's central axis, i.e. bore center, and reference numerals 'B1' and 'B2' represent two auxiliary line, respectively, which are perpendicular to the cylinder's central axis and cross at right angle. In FIG. 4, one intake port 35a is illustrated, and a valve seat mounting hole 65 is formed in the cylinder head. A valve seat, with which the intake valve 37 is in contact, is fit in the valve seat mounting hole 65. Similarly, a valve seat mounting hole is also formed in the other intake port 35b.

An injector 66 is mounted on the outer wall 63a of the curved portion 63 at the rear of the intake pipe 61 in order to inject gasoline serving as fuel to the fresh air flowing in the intake pipe 61. The gasoline is injected into the intake pipe 61 from a nozzle 67 at the end of the injector 66. As shown in FIG. 3, an injection area within an angle θ1 from an imaginary line 'S' connecting a center of the nozzle 67 with an intersection 68 between the intake ports 35a and 35b is set larger than an injection area within an angle θ2 from the imaginary line 'S'. According to this configuration, more fuel is supplied to the intake port 35a than the intake port 35b in accordance with a large amount of fresh air passes through the intake port 35a. Also, as shown in FIG. 4, the injector 66 is inclined downward with respect to the auxiliary line 'B1' at an angle α.

As described above, in the engine 10 in which the intake ports 35a and 35b are formed in the cylinder head 31 on one of the left and right sides with respect to the vehicle driving direction, the exhaust ports 36a and 36b are formed on the other side thereof, and the intake system is disposed ahead of the cylinder head 31 in the vehicle driving direction, since the intake pipe 61 is not formed ahead of and over the cylinder head 31 and the rocker cover 33 and passes around the cylinder head 31 to the side of the engine 10, it is possible to reduce the height of the engine body 32 having the intake pipe 61. In addition, since the injector 66 is disposed not on the upper surface of the intake pipe 61, but on the outer wall 63 on the rear side of the intake pipe 61, it is possible to reduce the height of the engine 10.

Further, since the intake pipe 61 passes around the cylinder head 31, the curved portion 63 is formed in the intake pipe 61 and the amount of the fresh air in the curved portion 63 may be different at the outer side and inner side of the curved portion 63. As a result, the fresh air swirls in the combustion chamber 34. Accordingly, since the swirl can be generated depending on the shape of the intake pipe 61, it is possible to generate the swirl by a simple structure without differentiating the lift amounts between the two intake valves and varying valve-opening timing of the two intake valves. Reference numeral 81 in FIG. 3 indicates a supporting hole where an exhaust valve shaft passes through, and reference numeral 82 in FIG. 4 indicates a supporting hole where an intake valve shaft passes through. In FIGS. 3 and 4, reference numeral 83 represents a concave face for supporting the cam shaft 39, and the cam shaft 39 is supported between the cylinder head 31 and the rocker cover 33.

The invention is not limited to the above exemplary embodiment, and may be modified in the scope of the invention. For example, even though the intake port 35 consisting of two intake ports, i.e. the first and second intake ports is provided in the cylinder head 31 in the above-described exemplary embodiments, single intake port may be provided in the cylinder head. In this case, the amount of the fresh air flowing through the single intake port may be different at the outer side and inner side of its airflow to generate swirl in the combustion chamber 34. Further, the engine 10 illustrated in FIGS. 1 and 2 is for an all terrain vehicle, however, the invention can be applied to another type vehicle.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An intake device for vehicle engine provided on a vehicle comprising:

a crank case that rotatably supports a crankshaft extending in a vehicle driving direction;

a cylinder in which a piston is reciprocatively mounted;

a cylinder head mounted on the cylinder;

an intake port opened to a combustion chamber between the piston and the cylinder head and positioned on one of right and left sides of the cylinder head with respect to the vehicle driving direction;

an exhaust port opened to the combustion chamber and positioned on the other of the right and left sides of the cylinder head;

an intake pipe connected to the intake port;

an exhaust pipe connected to the exhaust port; and an injector for injecting fuel into the intake pipe, wherein the intake pipe includes a curved portion extending from a front portion of the cylinder head to the side of the cylinder head, and the injector is mounted at an outer side wall of the curved portion of the intake pipe and wherein the cylinder head is provided with two intake ports including a first intake port into which fresh air at the outer area of the curved portion flows, and a second intake port into which fresh air at the inner area in the curved portion flows, thereby to generate swirl in the combustion chamber.

2. The intake device according to claim 1, wherein the intake pipe is bent at substantially 90 degree at the curved portion.

3. The intake device according to claim 1, wherein the curved portion is positioned under the top face of the cylinder head.

4. The intake device according to claim 1, wherein a nozzle of the injector is disposed on the outer wall of the curved portion.

5. The intake device according to claim 1, wherein the intake pipe does not pass over said cylinder head.

6. The intake device according to claim 1, further comprising:

a valve assembly positioned to open or close the intake and exhaust ports;

a valve-operating mechanism in drive communication with said valve assembly, said valve-operating mechanism being provided on said front portion of the cylinder;

wherein the intake and exhaust ports are positioned rearward of the valve-operating mechanism, and an upstream portion of the intake pipe extends in a forward to rearward direction and is provided to one of the left and right sides of the valve-operating mechanism and a downstream portion of the intake pipe extends in a direction transverse to the forward to rearward direction and to the intake port opening to the combustion chamber.

7. The intake device according to claim 1, further comprising:

a rocker cover mounted on the top surface of the cylinder head, and wherein the curved portion is positioned under the top surface of the cylinder head.

8. The intake device according to claim 1, wherein said curved portion is a closest curved portion of said intake pipe relative to the intake ports.

9. The intake device according to claim 1 wherein the curved portion has a continuous curvature from curvature origination until reaching an opening of the intake ports.

10. An intake device for vehicle engine provided on a vehicle comprising:

a crank case rotatably supporting a crankshaft extending in a vehicle driving direction;

a cylinder assembled to the crank case;

a piston reciprocatively mounted in the cylinder;

a cylinder head mounted on the cylinder and forming a combustion chamber with the piston and an intake port and an exhaust port opened to the combustion chamber and located opposite each other in a transverse direction;

an intake pipe connected to the intake port and having a curved portion extending from a front portion of the cylinder head to the side of the cylinder head;

an exhaust pipe connected to the exhaust port; and an injector for injecting fuel into the intake pipe and mounted at an outer side wall of the curved portion of the intake pipe and wherein the cylinder head is provided with two intake ports including a first intake port into which fresh air at the outer area of the curved portion flows, and a second intake port into which fresh air at the inner area in the curved portion flows, thereby to generate swirl in the combustion chamber.

11. The intake device according to claim 10, wherein the intake pipe does not pass over said cylinder head.

12. The intake device according to claim 10, further comprising:

a valve assembly positioned to open or close the intake and exhaust ports;

a valve-operating mechanism in drive communication with said valve assembly, said valve-operating mechanism being provided on said front portion of the cylinder;

wherein the intake and exhaust ports are positioned rearward of the valve-operating mechanism, and an upstream portion of the intake pipe extends in a forward to rearward direction and is provided to one of the left and right sides of the valve-operating mechanism and a downstream portion of the intake pipe extends in a direction transverse to the forward to rearward direction and to the intake ports opening to the combustion chamber.

13. The intake device according to claim 10, further comprising:

a rocker cover mounted on the top surface of the cylinder head, and wherein the curved portion is positioned under the top surface of the cylinder head.

14. The intake device according to claim 10, wherein said curved portion is a closest curved portion of said intake pipe relative to the intake port.

15. The intake device according to claim 10, wherein a nozzle of the injector is disposed on an outer wall of the curved portion.

16. The intake device according to claim 10 wherein the curved portion has a continuous curvature from curvature origination until reaching an opening of the intake ports.

17. An intake device for vehicle engine provided on a vehicle, comprising:

a crank case rotatably supporting a crank shaft extending in a vehicle travel direction;

a cylinder assembly having a cylinder, which cylinder is assembled to the crank case and has a front portion facing a forward direction of travel and an opposite rear portion, and said cylinder having a central axis;

a piston reciprocatively mounted in the cylinder along said central axis, said cylinder assembly including a cylinder head mounted on the cylinder to form a combustion chamber with the piston;

an intake port and an exhaust port, said intake and exhaust ports opening into the combustion chamber and located, relative to a transverse axis intersecting said central axis, to respective left and right side portions of the cylinder assembly;

an intake pipe having a curved portion extending in a front to rear direction such that a rear end of the curved portion is in communication with said intake port at one of said left and right side portions of said cylinder assembly; and an injector for injecting fuel into the intake pipe and mounted at an outer side wall of the curved portion of the intake pipe and wherein the cylinder head is provided with two intake ports including a first intake port into which fresh air at the outer area of the curved portion flows, and a second intake port into which fresh air at the inner area in the curved portion flows, thereby to generate swirl in the combustion chamber.

18. The intake device according to claim 17, further comprising:
   a valve assembly positioned to open or close the intake and exhaust ports;
   a valve-operating mechanism in drive communication with said valve assembly, said valve-operating mechanism being provided on said front portion of the cylinder, and
   wherein the intake and exhaust ports are positioned rearward of the valve-operating mechanism, and an upstream portion of the intake pipe extends in a forward-to-rearward direction and is provided to one of the left and right sides of the valve-operating mechanism and a downstream portion of the intake pipe extends in a direction transverse to the forward-to-rearward direction.

19. The intake device according to claim 17, wherein the central axis has a vertical component.

20. The intake device according to claim 17, wherein said cylinder assembly further comprises:
   a rocker cover mounted on a top surface of the cylinder head, and
   wherein the curved portion is positioned under the top surface of said cylinder head.

21. The intake device according to claim 17, wherein said curved portion is a closest curved portion of said intake pipe relative to the intake ports.

22. The intake device according to claim 17, wherein said curved portion remains below a plane lying flush on a top surface of said cylinder head.

23. The intake device according to claim 22, wherein said curved portion lies between the plane lying flush on the top surface of said cylinder head and a plane lying flush on an upper, head mounting surface of said cylinder.

24. The intake device according to claim 17, wherein a nozzle of the injector is disposed on an outer wall of the curved portion.

25. The intake device according to claim 17 wherein the curved portion has a continuous curvature from curvature origination until reaching an opening of the intake ports.

* * * * *